US011993200B1

(12) United States Patent
Elseser

(10) Patent No.: US 11,993,200 B1
(45) Date of Patent: May 28, 2024

(54) PIVOTING LATCH LOCKING ASSEMBLIES FOR HEIGHT-ADJUSTABLE TWISTLOCKS

(71) Applicant: Buffers USA, Inc., Jacksonville, FL (US)

(72) Inventor: Jeffrey Elseser, St. Augustine, FL (US)

(73) Assignee: BUFFERS USA, INC., Jacksonville, FL (US)

( * ) Notice: Subject to any disclaimer, the term of this patent is extended or adjusted under 35 U.S.C. 154(b) by 686 days.

(21) Appl. No.: 17/205,675

(22) Filed: Mar. 18, 2021

(51) Int. Cl.
*B60P 7/13* (2006.01)

(52) U.S. Cl.
CPC .................................... *B60P 7/132* (2013.01)

(58) Field of Classification Search
CPC ...................................................... B60P 7/132
USPC ..................................................... 410/82, 83
See application file for complete search history.

(56) References Cited

U.S. PATENT DOCUMENTS

| 3,486,787 | A | * | 12/1969 | Campbell | B62D 21/02 410/83 |
| 3,521,845 | A | * | 7/1970 | Sweda | B60P 7/132 410/83 |
| 3,701,562 | A | * | 10/1972 | Carr | B60P 7/132 410/82 |
| 4,047,748 | A | * | 9/1977 | Whaley | B60P 7/132 410/82 |
| 4,240,359 | A | * | 12/1980 | Howe | B65D 88/129 108/56.1 |
| 4,321,000 | A | * | 3/1982 | Novak | B60P 7/132 410/82 |

(Continued)

FOREIGN PATENT DOCUMENTS

| DE | 1803973 A1 | * | 6/1969 | |
| GB | 1523863 A | * | 9/1978 | ............. B60P 7/132 |
| GB | 2070125 A | * | 9/1981 | ............. B60P 7/132 |

*Primary Examiner* — Hilary L Gutman
(74) *Attorney, Agent, or Firm* — BROWDY AND NEIMARK, P.L.L.C.

(57) ABSTRACT

A locking latch assembly for an adjustable-height twistlock assembly includes a mounting bracket configured to be secured to a housing base of the twistlock assembly, a latch having a forked portion configured to engage with a shaft rigidly connected to a locking pin of the twistlock assembly, an axle passing through the mounting bracket, and a latch pin secured on the mounting bracket. The latch is secured around the axle to allow the latch to pivot relative to the mounting bracket. The latch pin engages a first surface of the latch when the latch is in a locked position, and engages a second surface of the latch when the latch is in an unlocked position. The forked portion of the latch is configured to engage with the shaft, in the locked position of the latch, so that the shaft is substantially restricted from rotational movement. The locking pin has a head and a stem, and the shaft is secured to the stem. The stem has an upper bolt hole and a lower bolt hole passing therethrough, the upper bolt hole passing through the stem in a direction perpendicular to the lower bolt hole. The shaft has an upper bolt hole and a lower bolt hole passing therethrough, the upper bolt hole passing through the stem in a same direction as the lower bolt hole. The shaft is adjustably secured to the stem of the locking pin by a bolt passing through the upper bolt holes of the shaft and the stem or passing through the lower bolt holes of the shaft and the stem.

20 Claims, 11 Drawing Sheets

(56) References Cited

U.S. PATENT DOCUMENTS

| | | | | |
|---|---|---|---|---|
| 4,394,101 | A * | 7/1983 | Richer | B60P 7/132 248/500 |
| 4,419,034 | A * | 12/1983 | DiMartino | B60P 7/132 24/453 |
| 4,437,211 | A * | 3/1984 | Dorpmund | B65D 90/0013 410/82 |
| 4,507,032 | A * | 3/1985 | Rosaia | B60P 7/132 410/83 |
| 4,697,967 | A * | 10/1987 | Schulz | B60P 7/132 410/82 |
| 6,881,003 | B1 * | 4/2005 | Zeller | F21V 21/38 403/348 |
| 9,021,671 | B2 * | 5/2015 | Kapelski | B65D 90/002 410/82 |
| 2021/0394666 | A1 * | 12/2021 | Newstead | B65D 90/0013 |

* cited by examiner

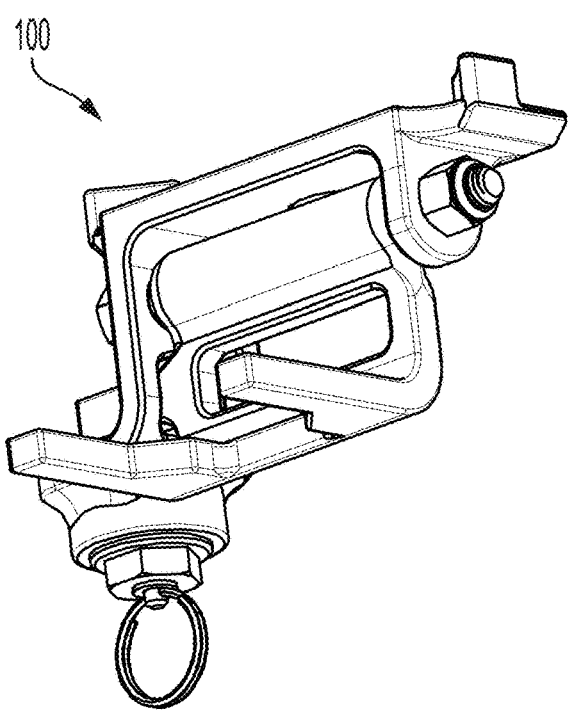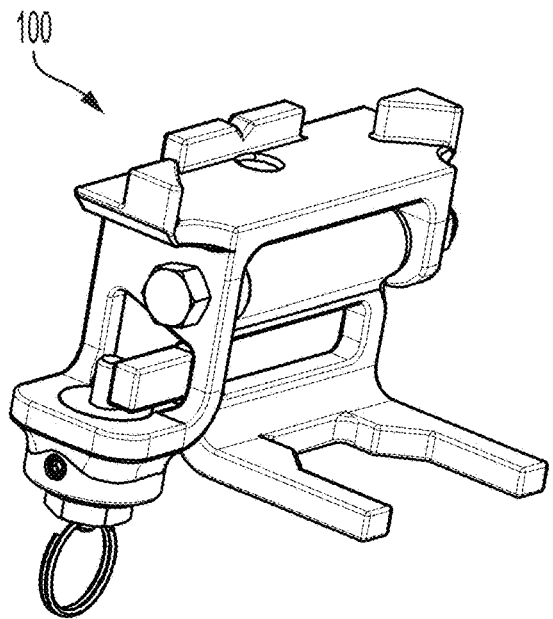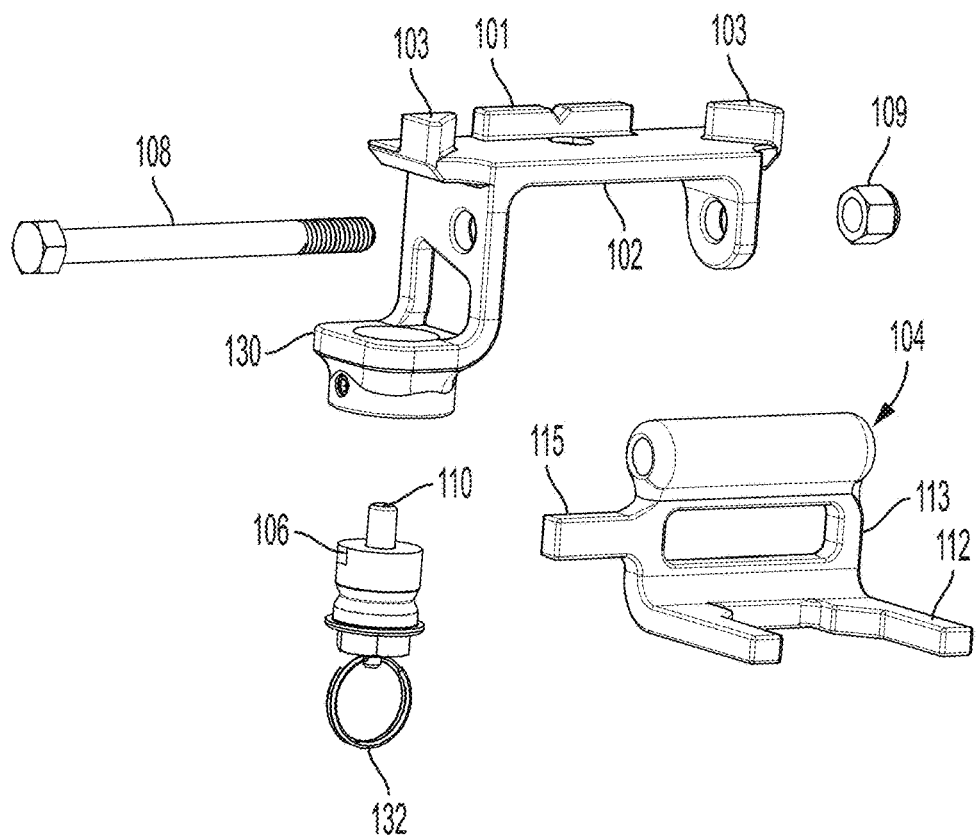
FIG. 1A
FIG. 1B
FIG. 1C

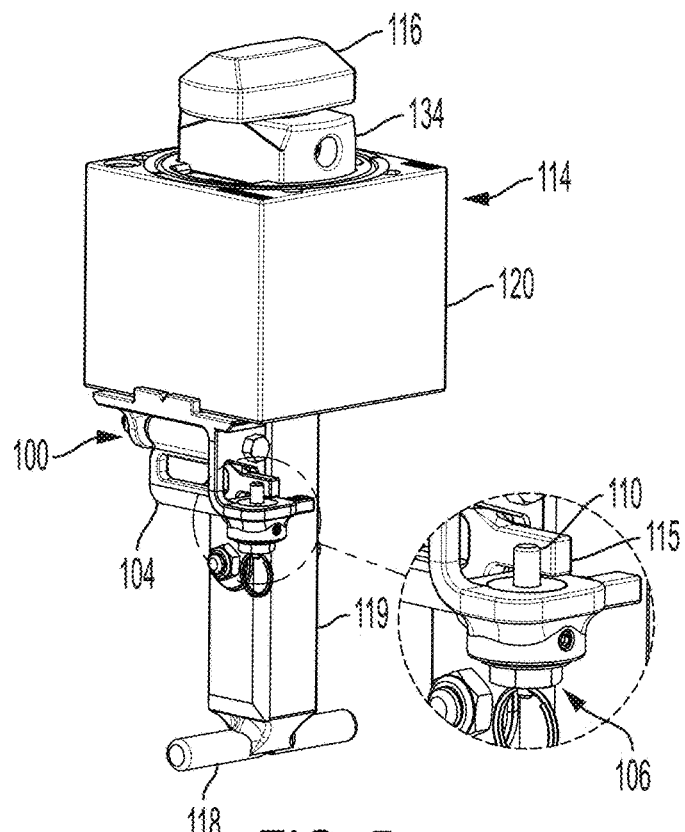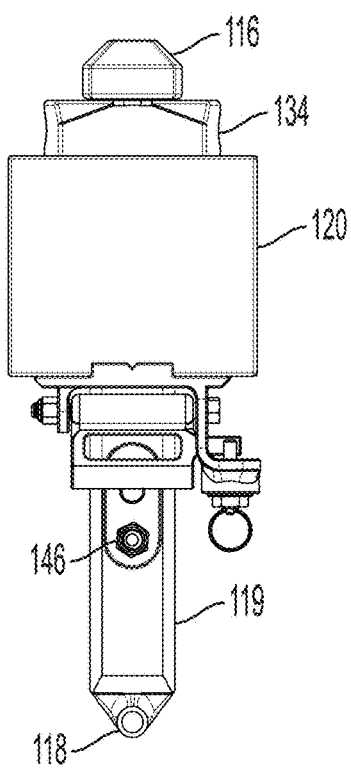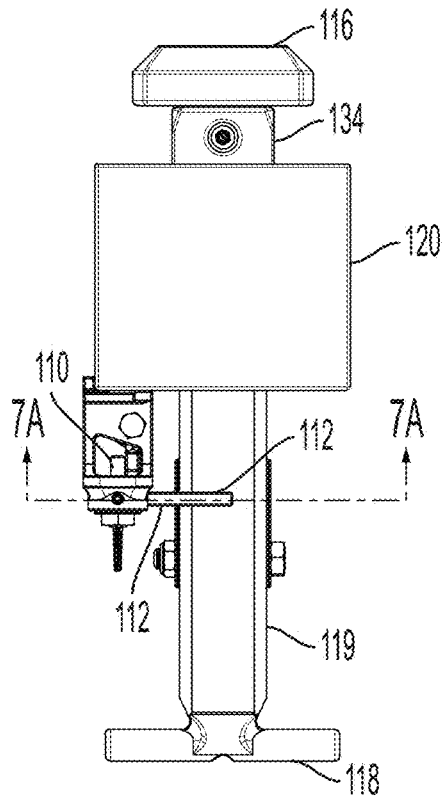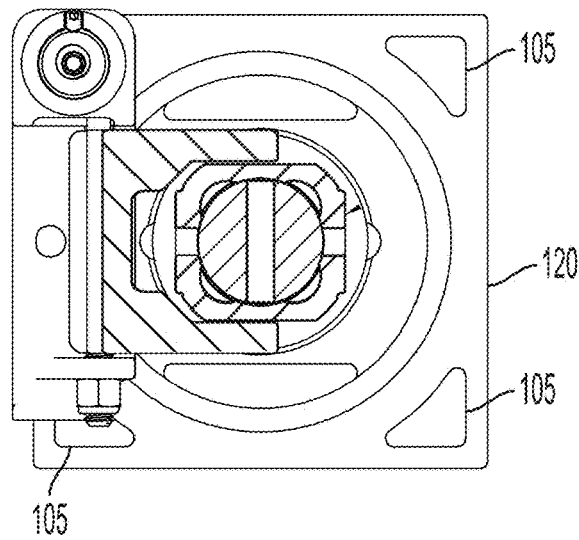
FIG. 5
FIG. 6
FIG. 7
FIG. 7A

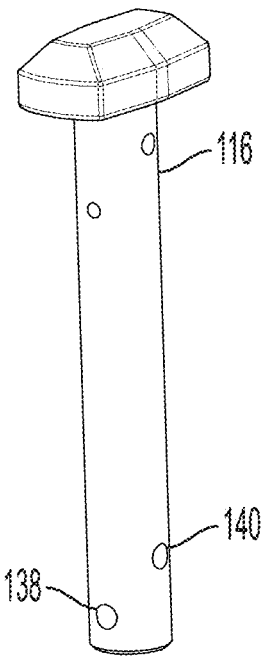 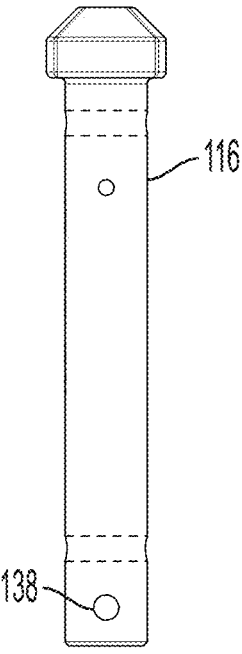 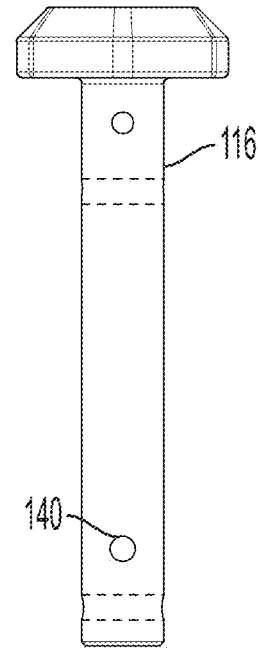
FIG. 18A  FIG. 18B  FIG. 18C
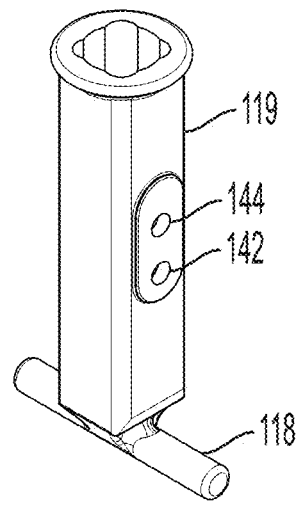 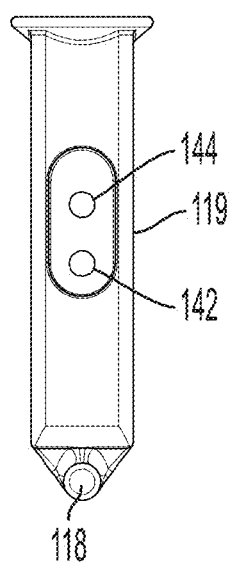
FIG. 19A  FIG. 19B

PIVOTING LATCH LOCKING ASSEMBLIES FOR HEIGHT-ADJUSTABLE TWISTLOCKS

TECHNICAL FIELD

The field of this invention generally relates to locking mechanisms for twistlock assemblies that secure shipping containers to the chassis of semi-trailer trucks and the like, and more particularly to pivoting latch locking assemblies for locking height-adjustable vehicle twistlock assemblies, with or without handles, in both extended and non-extended positions of the twistlock assembly, to prevent the locking pin of the twistlock assembly from twisting from locked to open position.

BACKGROUND

Twistlock assemblies were developed to secure ISO shipping containers to semi-trailer container chassis and flatbeds (collectively referred to as "vehicles" herein). There are typically four twistlock assemblies per vehicle and each includes a housing and a T-shaped locking pin. A twistlock housing has a hole for the T-shaped locking pin and can be, but is not limited to, a cantilever type welded to vehicle bolster ends, or drop-in type welded in a cutout of the bolster ends, or simply a shear block welded into a bolster tube forming a housing. The T-shaped twistlock locking pin fits inside a hole in the twistlock housing and can be rotated from an unlocked position to a locked position. When a shipping container is loaded on a vehicle, the four corner castings on the shipping container rest on the top of each twistlock housing. The locking pin protrudes upward through the rectangular ISO aperture hole of each corner casting and can be rotated to locked position so that the shipping container is locked to the vehicle. This locking action enables safe and secure transporting of the shipping container.

Operation of each twistlock is typically accomplished manually by a person standing on the ground in front of each twistlock assembly. Once the container is loaded onto the four opened twistlocks on the vehicle, the twistlocks are typically manually locked by moving a handle attached to the bottom of the twistlock locking pin about a quarter turn to place the head of the T-shaped twistlock locking pin perpendicular to the corner casting rectangular aperture hole. The handle may be a T-handle at the end of the T-shaped twistlock locking pin. To open the lock the manual procedure is reversed by moving the handle in the opposite direction. However, twistlocks need not necessarily include such T-handles attached to the bottom of the twistlock locking pin.

Certain twistlock assemblies are height-adjustable. Typically, such height-adjustable twistlock assemblies are designed to overcome the camber with which most aluminum flatbeds are manufactured (only steel flatbeds are flat; aluminum flatbeds sag too much to be flat when unloaded). If a 40-foot or 53-foot container is placed on a 40-foot or 53-foot aluminum flatbed, the camber in the middle of the aluminum flatbed might cause the container to be in a rocking position that would make it difficult to lock the container down onto the flatbed on the four corner twistlock assemblies. Height-adjustable twistlocks overcome the camber by having the capability of being screwed up from the flatbed deck to accommodate an elevated container, i.e., in order to accommodate a gap that might exist between the bottom surface of a corner casting of a shipping container and the top surface of the flatbed deck at the location of the particular corner casting. The locks are manually adjusted up before the container is loaded. Once the container is loaded the locks are manually locked.

Height-adjustable twistlock assemblies may include internal detent mechanisms for positioning the T-shaped twistlock locking pin in its locked position within the twistlock assembly.

It is known to employ swing latches and gravity latches to lock the locking pins of retractable or non-retractable vehicle twistlocks, but these swing latches and gravity latches do not accommodate height-adjustable twistlock assemblies.

SUMMARY

It is an object of the present invention to provide a simple, convenient, and reliable locking mechanism for height-adjustable twistlock assemblies that is economical to manufacture, and that can be used with twistlock assemblies with or without handles.

One aspect of the invention is directed toward a locking latch assembly for a twistlock assembly that is adjustable over a range of heights of a load level of the twistlock assembly relative to a deck level of the twistlock assembly. The twistlock assembly includes a housing base and a locking pin rigidly connected with a shaft (which can be a neck of a T-handle, an extension tube, or even the stem of the locking pin itself). The locking pin has an adjustable vertical position relative to the housing base of the twistlock assembly that corresponds to a vertical position of the load level of the twistlock assembly relative to the deck level of the twistlock assembly. The locking latch assembly includes a mounting bracket configured to be secured to the housing base of the twistlock assembly, a latch having a forked portion configured to engage with the shaft, an axle passing through the mounting bracket, and a latch pin secured on the mounting bracket. The latch is secured around the axle to allow the latch to pivot relative to the mounting bracket. The latch pin engages a first surface of the latch when the latch is in a locked position in which the latch is at a first angular position relative to the mounting bracket and the forked portion of the latch engages with the shaft, and engages a second surface of the latch when the latch is in an unlocked position in which the latch is at a second angular position relative to the mounting bracket and the forked portion of the latch is disengaged from the shaft. The latch pin is configured to be disengaged from the latch to allow the latch to pivot relative to the mounting bracket between the locked position and the unlocked position. The forked portion of the latch is configured to engage with the shaft, in the locked position of the latch, so that the shaft is substantially restricted from rotational movement while the latch is in the locked position, throughout all of the range of heights of the twistlock assembly.

The design is uncomplicated yet can be very effective and economical to manufacture and very lightweight yet strong enough for its purpose. The locking assembly serves as a reliable positive locking mechanism supplemental to an internal positioning mechanism of a height-adjustable twistlock assembly. The design is easy to operate and very safe.

Another aspect of the invention is directed toward the twistlock assembly, in which the locking pin is a T-shaped twistlock locking pin having a head and a stem, the stem of the T-shaped twistlock locking pin passing through the housing base. A shaft, such as an extension tube having a square cross-section, is secured to the stem of the T-shaped locking pin. The stem of the T-shaped twistlock locking pin has an upper bolt hole and a lower bolt hole passing therethrough. The upper bolt hole passes through the stem in a direction perpendicular to the lower bolt hole. The shaft has an upper bolt hole and a lower bolt hole passing therethrough, the upper bolt hole passing through the stem in a same direction as the lower bolt hole. The shaft is adjustably secured to the stem of the T-shaped twistlock locking pin by a bolt passing through the upper bolt holes of the shaft and the stem or passing through the lower bolt holes of the shaft and the stem.

This design enables the locking latch assembly to be mounted on the twistlock assembly on any side of the twistlock assembly, based on the available space around the twistlock assembly on a vehicle, such that the latch pivots in either a longitudinal direction along the length of a flatbed, or in a transverse direction along the shorter sides of a flatbed. If it is desired to mount the latch locking assembly so that the latch pivots in a transverse direction, then the bolt can be inserted through the lower handle bolt holes of the locking pin stem and the shaft, so that the bolt cannot interfere with the latch. If it is desired to mount latch locking assembly so that the latch pivots in a longitudinal direction, then the bolt can be inserted through the upper handle bolt holes of the locking pin stem and the shaft, so that the bolt 146 cannot interfere with the latch.

The details of various embodiments of the invention are set forth in the accompanying drawings and the description below. Numerous other features and advantages of the invention will be apparent from the description, the drawings, and the claims.

DESCRIPTION OF THE DRAWINGS

FIGS. 1A and 1B are perspective views of a latch assembly according to the invention.

FIG. 1C is an exploded view of the latch assembly of FIGS. 1A and 1B.

FIG. 5 is a perspective view of the latch assembly of FIGS. 1A and 1B welded to a height-adjustable twistlock assembly, with the latch assembly in the locked position.

FIG. 6 is a front view of the latch and twistlock assemblies of FIG. 5.

FIG. 7 is a side view of the latch and twistlock assemblies of FIG. 5 as viewed from a direction perpendicular to the view shown in FIG. 6.

FIG. 7A is a cross-sectional view taken along line 7A-7A in FIG. 7.

FIG. 18A is a perspective view of a T-shaped locking pin of a twistlock assembly for use with a latch according to the invention.

FIG. 18B is a side view of the T-shaped locking pin of FIG. 18A as seen from the end of the rectangular head.

FIG. 18C is a side view of the T-shaped locking pin of FIG. 18A as seen from the side of the rectangular head, perpendicular to the side view of FIG. 18B.

FIG. 19A is a perspective view of a T-handle with square extension tube for use with the T-shaped locking pin of FIG. 18A.

FIG. 19B is a side view of the handle and neck of FIG. 19A.

DETAILED DESCRIPTION

Figure 2:
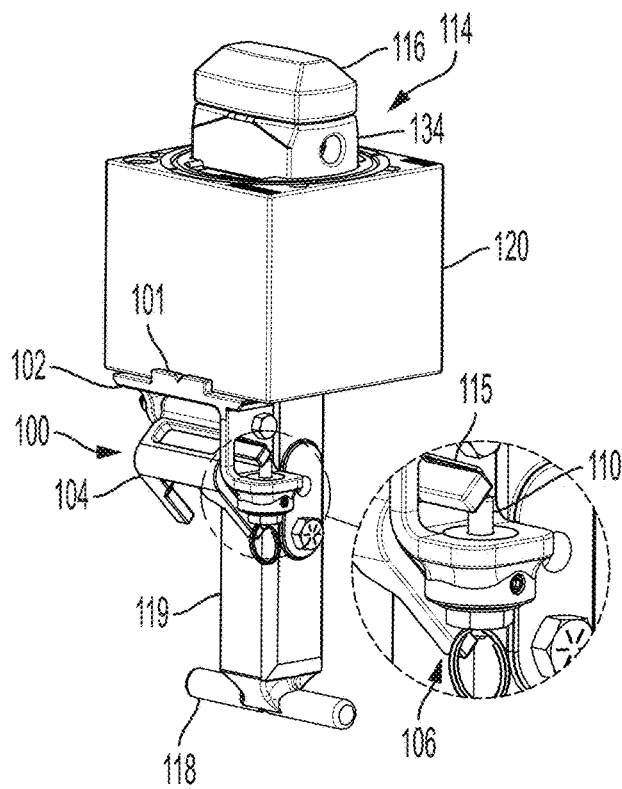
FIG. 2 is a perspective view of the latch assembly of FIGS. 1A and 1B welded to a height-adjustable twistlock assembly, with the latch assembly in the unlocked position.

With reference to FIGS. 1A, 1B, and 1C, there is shown a fork-type latch locking assembly 100 according to the invention, which includes a mounting bracket 102, which is to be welded to the bottom of the twistlock housing, a pivoting gravity forked latch 104, which is fitted to latch mounting bracket 102 by a hex bolt 108 that also functions as an axle on which latch 104 pivots, and a spring-loaded pull pin assembly 106 fitted on mounting bracket 102. Latch 104 includes a flat U-shaped forked portion 112 shaped to engage two sides of a square extension tube, with or without a T-handle, of a twistlock assembly, and a flat portion 113 angled at a right angle with respect to the forked portion 112 and having a tab 115 for engagement with a latch pin 110 of pull pin assembly 106.

Pull pin assembly 106 controls the position of latch 104 with two position: unlocked, in an inactive open position, with the forked portion 112 of latch 104 being angled at about 45 degrees with respect to horizontal, and locked, in an active engaged position, with the forked portion 112 of latch 104, with its forked latch legs, being in a substantially horizontal position. Pull pin assembly 106 includes a spring-loaded vertical latch pin 110 that acts on tab 115 of forked latch 104 close to the hex bolt 108 on mounting bracket 102 with which latch 104 is connected to mounting bracket 102. Hex bolt 108 passes all the way through mounting bracket 102 and functions as an axle on which latch 104 pivots. Hex bolt 108 is secured by hex nut 109. As is shown in FIG. 2, pull pin assembly 106 is fitted on the latch mounting bracket 102 by being fixedly mounted within a tab 130 of mounting bracket 102. When a user pulls on ring 132 of pull pin assembly 106, pull pin 110 retracts with ring 132 away from engagement with tab 115.

Figure 3:
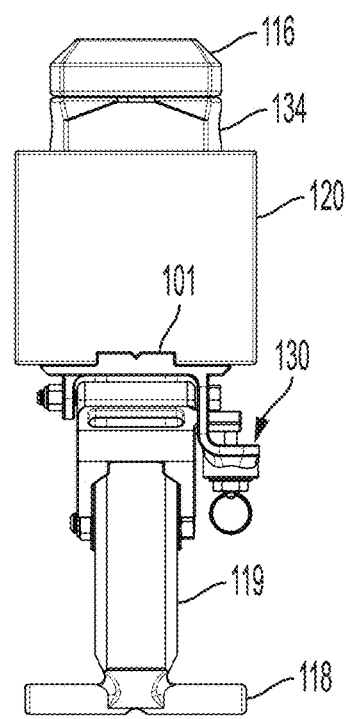
FIG. 3 is a front view of the latch and twistlock assemblies of FIG. 2.
Figure 4:
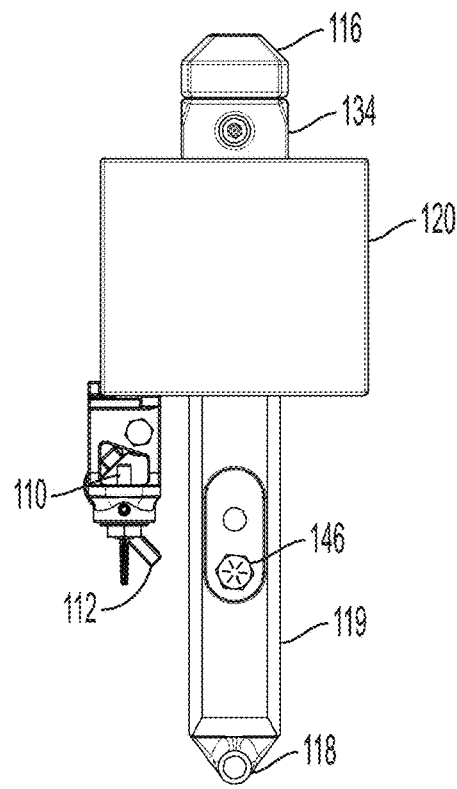
FIG. 4 is a side view of the latch and twistlock assemblies of FIG. 2 as viewed from a direction perpendicular to the view shown in FIG. 3.

FIGS. 2-4 illustrate latch locking assembly 100 attached to height-adjustable vehicle twistlock assembly 114, with latch 104 being shown in the "up" or "unlocked" position. Mounting bracket 102 is welded onto a bottom surface of twistlock housing base 120. Mounting bracket 102 has tabs 103, as shown in FIG. 1C, that fit within corresponding recesses 105 in the bottom surface of twistlock housing base 120 as shown in FIG. 7A, as well as a tab 101 that is welded onto a side surface of twistlock housing base 120 near its bottom. Latch pin 110 locks latch 104 in the up/unlocked position, to enable a user to operate handle 118 of twistlock assembly 114 by rotating handle 118 to rotate T-shaped twistlock locking pin 116, the head of which is positioned above shear block 134 and the stem of which passes through shear block 134 and twistlock housing base 120 and is secured to T-handle 118. In the specific twistlock assembly model illustrated in FIGS. 2-4, handle 118 has a square extension tube 119 with a square cross-section having a square central passage through which the stem of T-shaped twistlock locking pin 116 can be inserted and secured with a handle bolt 146, thereby securing T-shaped twistlock locking pin 116 to handle 118. In the up/unlocked position of latch 104 illustrated in FIGS. 2-4, latch 104 is disengaged from neck 119 of handle 118.

FIGS. 5-7 illustrate latch locking assembly 100 attached to height-adjustable twistlock assembly 114, with the latch assembly in the "down" or "locked" position so that handle 118 cannot rotate. In this configuration, latch pin 110 locks latch 104 in the down/locked position in which forked portion 112 of latch 104 engages and grasps neck 119 of handle 118 so that handle 118 cannot be rotated to rotate twistlock locking pin 116, and the twistlock locking pin is prevented from turning or twisting. The forks of the forked portion 112 of latch 104 engage on the flat sides of handle tube 119 (the sides through which handle bolt 146 does not pass), so that handle bolt 146 cannot interfere with the forked latch legs of latch 104 regardless of any adjustment in height of handle 118 and neck 119 relative to twistlock housing base 120 and latch 104. Thus, pull pin assembly 106 locks pivoting forked latch 104 in either an inactive open position as shown in FIGS. 2-4 or an active engaged position as shown in FIGS. 5-7.

It can be seen that latch locking assembly 100 forms a lock to prevent twistlock locking pin 116 from twisting from a locked position to an open position, by locking and thereby controlling handle tube 119 of handle 118, tube 119 being secured to the stem of T-shaped twistlock locking pin 116. This lock is required only when locking pin 116 is in the locked position, and is secondary to an internal locking mechanism of height-adjustable twistlock assembly 114 in the form of steel detent balls that protrude outward from the portion of T-shaped twistlock locking pin 116 that passes through shear block 134 and that press in an outwards direction to engage with grooves inside shear block 134.

The configuration of latch 104 enables it to operate in any position within a vertical space of three inches (the range of adjustability of the height of the load level of twistlock assembly 114 relative to twistlock housing base 120). In particular, even if twistlock locking pin 116 is moved up to three inches vertically relative to twistlock housing base 120 due to the position of twistlock locking pin 116 being height-adjusted by a user, twistlock locking pin 116 can be locked by latch 104 by forked portion 112 of latch 104 locking around square tube 119 of handle 118.

The configuration and design of latch 104 enables the latch to work on locking pin handle 118 in all positions over the vertical range of three inches and to be able to be locked in position throughout this three-inch range to prevent unintentional unlocking of T-shaped locking pin 116. Thus, latch 104 can operate from the lowest to the highest load level of the twistlock assembly. In this manner, latch locking assembly 100 acts as a secondary lock on handle 118 on a height-adjustable vehicle twistlock.

It can be seen from the enlarged insets of FIGS. 2 and 5, which show latch assembly 100 in greater detail and clarity, that latch pin 110 engages a first surface of tab 115 of latch 104 when the latch is in a substantially vertical locked position, and engages a second surface of the tab 115 of latch 104 when the latch is in an unlocked position.

Figure 8:
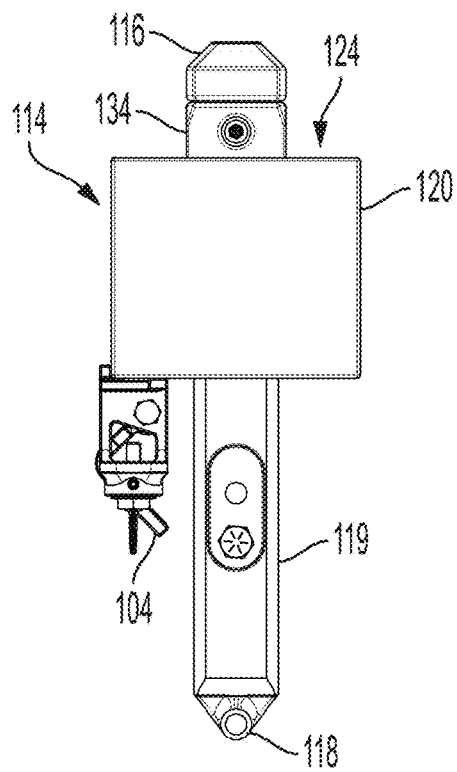
FIG. 8 is a side view of the latch and twistlock assemblies of FIG. 3 with twistlock load level in the lowest position, the twistlock unlocked, and the latch in the unlocked up position.
Figure 9:
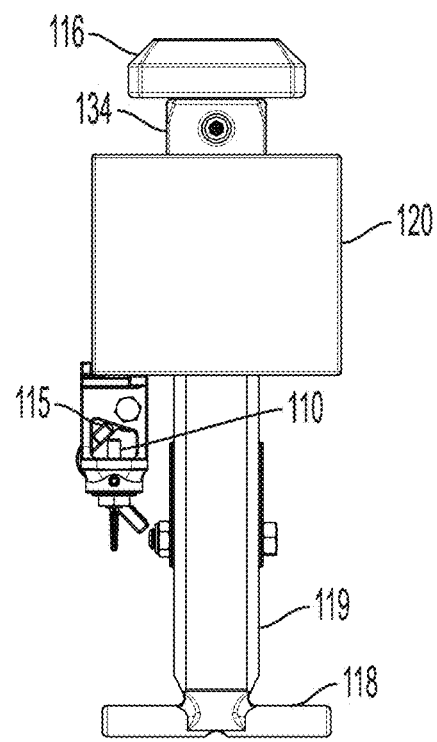
FIG. 9 is a side view of the latch and twistlock assemblies of FIG. 8 with the twistlock locking pin turned to the locked position.
Figure 10:
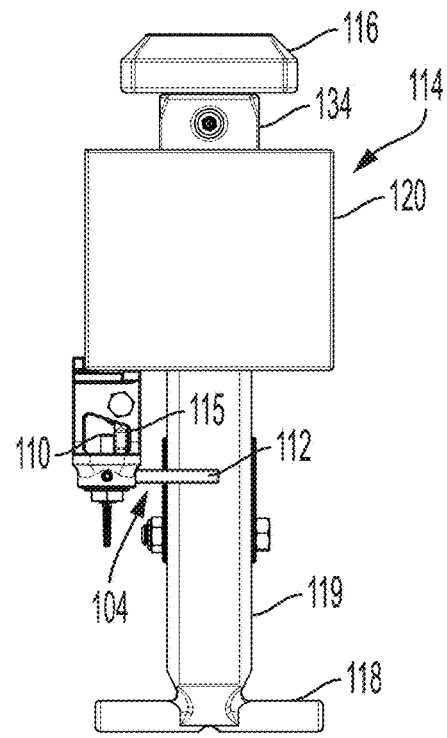
FIG. 10 is a side view of the latch and twistlock assemblies of FIG. 9 with the latch lowered to capture the square extension tube with the T-handle of the twistlock assembly.

FIGS. 8-10 illustrate twistlock assembly 114 in its height-adjustable lowest and non-retracted position. Load level 124 (where the shipping container sits and rests while being loaded with freight) is at the top of twistlock housing base 120. In one embodiment, the distance between load level 124 and the center of handle 118 is thirteen and ⅝ inches. In FIG. 8 twistlock assembly 114 is unlocked and latch 104 is in the unlocked up position. To arrive at the non-extended locked position shown in FIG. 9, T-handle 118 must be rotated 90 degrees, without any lifting of T-handle 118, to rotate the head of twistlock locking pin 116 relative to shear block 134 while shear block 134 is in a recessed position within the top plate of the twistlock assembly. In FIG. 9, T-handle 118 has been rotated to turn twistlock locking pin 116 to the locked position. In FIG. 10, latch 104 has been pivoted (lowered) to the locked "down" position to capture neck 119 of T-handle 118 of twistlock assembly 114 (which is accomplished by pulling latch pin 110 downwards to disengage the tab 115 of latch 104 from latch pin 110, allowing latch 104 to be pivoted so that forked portion 112 of latch 104 engages on square tube 119 of T-handle 118). Latch pin 110 can now be released, so that the latch pin engages on a surface of tab 115 of latch 104. At this point, T-handle 118 cannot rotate, and so twistlock assembly 114 is fixed in the locked position. To unload a shipping container from the vehicle, a user can pull latch pin 110 downwards again, thereby disengaging the latch pin from tab 115 of latch 104 so that latch 104 can pivot into the unlocked up position. Latch pin 110 can now be released, so that the latch pin engages on another surface of latch 104. Then, the user can rotate T-handle 118 to rotate the head of locking pin 116 so that the head of locking pin 116 is parallel to shear block 134. Now, a shipping container can be lifted off of the vehicle.

Figure 11:
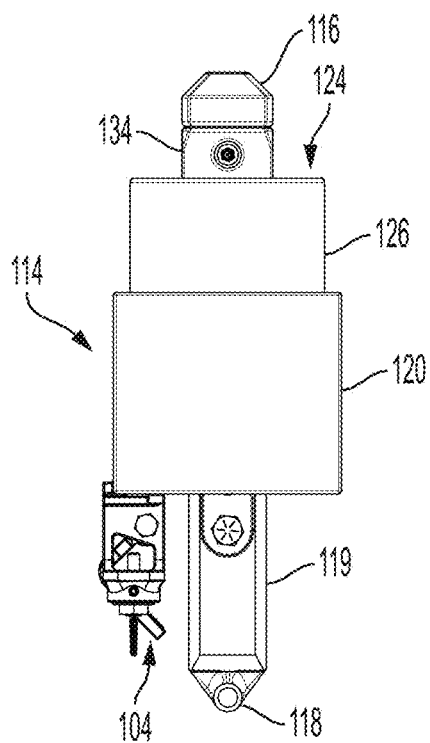
FIG. 11 is a side view of the latch and twistlock assemblies of FIG. 3 with twistlock load level in the highest position, the twistlock unlocked, and the latch in the unlocked up position.
Figure 12:
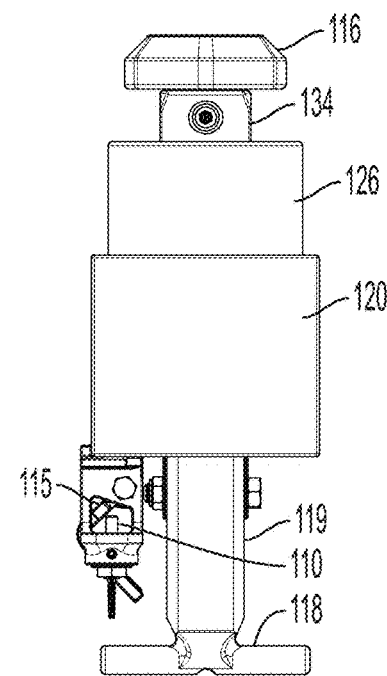
FIG. 12 is a side view of the latch and twistlock assemblies of FIG. 11 with the twistlock locking pin turned to the locked position.
Figure 13:
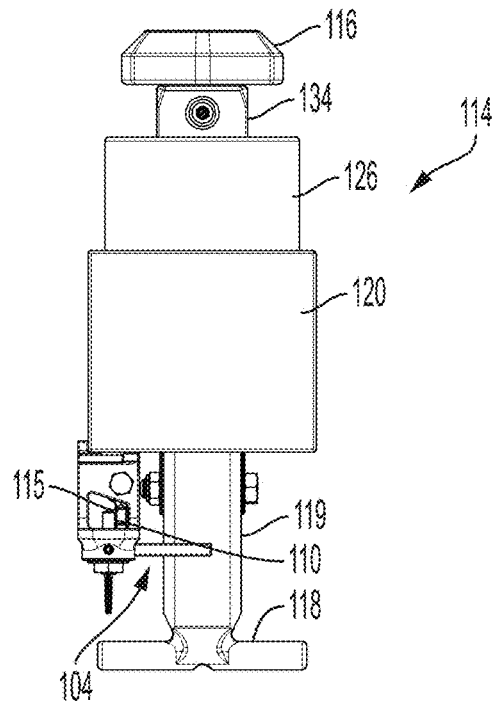
FIG. 13 is a side view of the latch and twistlock assemblies of FIG. 12 with the latch lowered to locked position to capture the square extension tube with the T-handle of the twistlock assembly.
Figure 14:
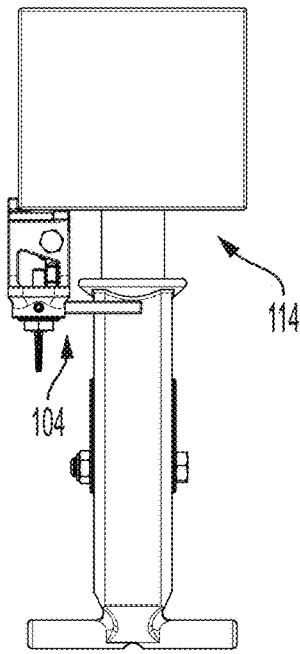
FIG. 14 is a side view of the latch and twistlock assemblies of FIG. 3 with the twistlock assembly in the fully retracted position, and the latch in the locked position.

FIGS. 11-13 illustrate twistlock assembly 114 in its height-adjustable highest non-retracted position. In this position, the distance between load level 124 and the center of handle 118 remains 13 and 5/8 inches, but load level 124 is about three inches higher than the top of twistlock housing base 120. The twistlock assembly can be adjusted from the non-extended locked position shown in FIGS. 8-10 to the fully extended, maximum height, locked position shown in FIGS. 11-13 by first turning T-handle 118 90 degrees to rotate the head of locking pin 116 into alignment with shear block 134, and then lifting and rotating T-handle 118 to rotate shear block 134 and the head of locking pin 116 into alignment with a main center hole in twistlock inner housing 126 so that the head of locking pin 116 and shear block 134 drop into the main center hole in twistlock inner housing 126, which brings the twistlock assembly into a fully retracted position (FIG. 14). Then T-handle 118 can be rotated to cause cylindrical twistlock inner housing 126 to be threaded upwards within twistlock housing base 120, which has a square horizontal cross-section, the external threads of twistlock inner housing 126 engaging internal threads of twistlock housing base 120, such that all components other than twistlock housing base 120 rotate relative to twistlock housing base 120 until twistlock inner housing 126 is extended to the desired height. In this manner, inner housing 126 threads up and down inside outer twistlock housing base 120. Then, T-handle 18 is lifted to cause the head of locking pin 116 and shear block 134 to be pushed upwards within the main center hole in twistlock inner housing 126 until the head of locking pin 116 and shear block 134 are all clear of the main center hole in twistlock inner housing 126. Then, T-handle 118 can be turned 90 degrees to rotate the head of locking pin 116 and shear block 134, after which shear block 134 can be allowed to drop into and rest within a shallow recess of twistlock inner housing 126. Next, T-handle 118 can again be rotated 90 degrees, without any lifting of T-handle 118, to rotate the head of locking pin 116 relative to shear block 134 while shear block 134 is locked within the shallow recess of twistlock inner housing 126.

Load level 124 (where the shipping container rests) is at the top of twistlock inner housing 126. In FIG. 11 twistlock assembly 114 is unlocked and latch 104 is in the up position. In FIG. 12, T-handle 118 has been rotated to turn twistlock locking pin 116 to the locked position. In FIG. 13, latch 104 has been pivoted (lowered) to the down position to engage with and capture neck 119 of T-handle 118 of twistlock assembly 114. At this point, T-handle 118 cannot rotate, and so twistlock assembly 114 is fixed in the locked position. If it is desired to unload a shipping container from the vehicle, latch pin 110 can be pulled, thereby releasing latch pin 110 from a surface of tab 115 of latch 104, and latch 104 can be pivoted to the up position, after which pull pin 110 can be released, so that the latch pin engages on a different surface of tab 115 of latch 104. Latch 104 is now in the up position, and T-handle 118 can be rotated to rotate twistlock locking pin 116 so that the locking pin is parallel to shear block 134. Now a shipping container can be lifted off of the vehicle.

FIG. 14 illustrates twistlock assembly 114 in its lowest height adjustable and fully retracted position. Latch 104 remains adjustable between its up and down positions in this fully retracted position of twistlock assembly 114.

Figure 15:
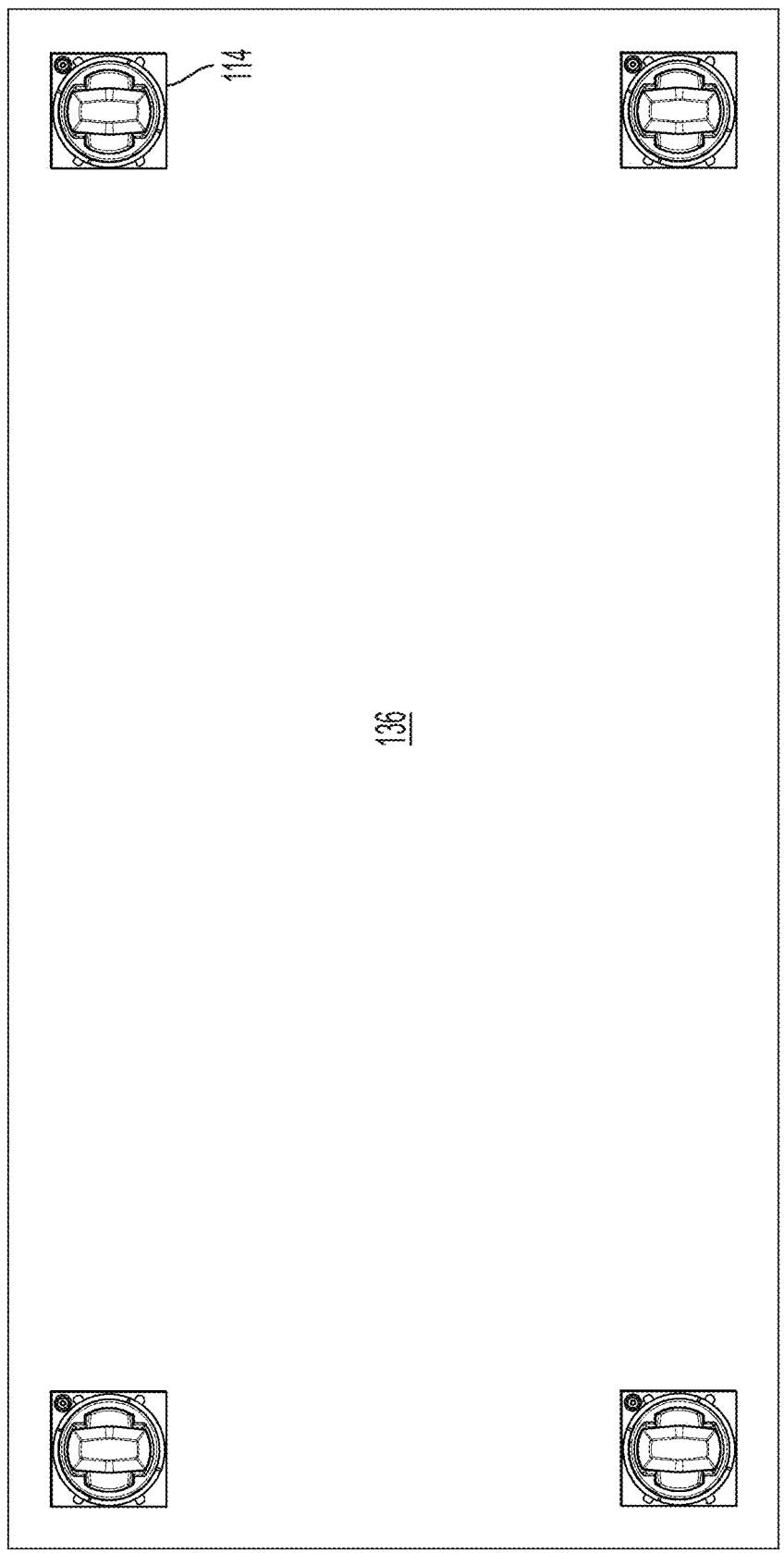
FIG. 15 is a top view of a flatbed having four twistlock assemblies mounted thereon.
Figure 16:
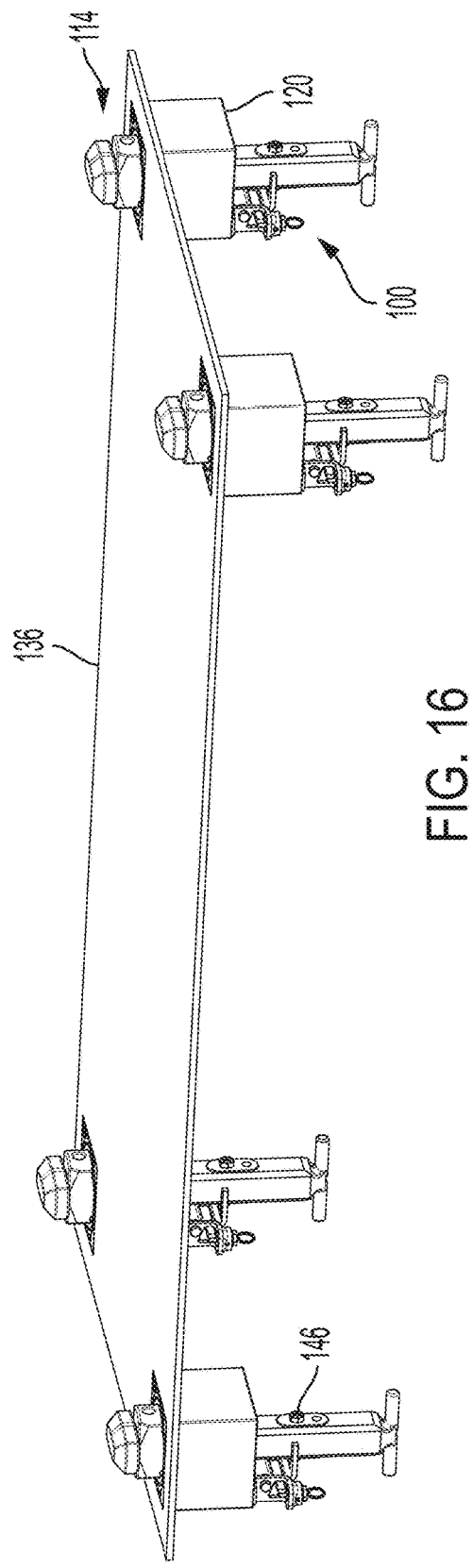
FIG. 16 is a perspective view of the flatbed of FIG. 15, in which the latches of the twistlock assemblies are mounted to pivot in a longitudinal direction.
Figure 17:
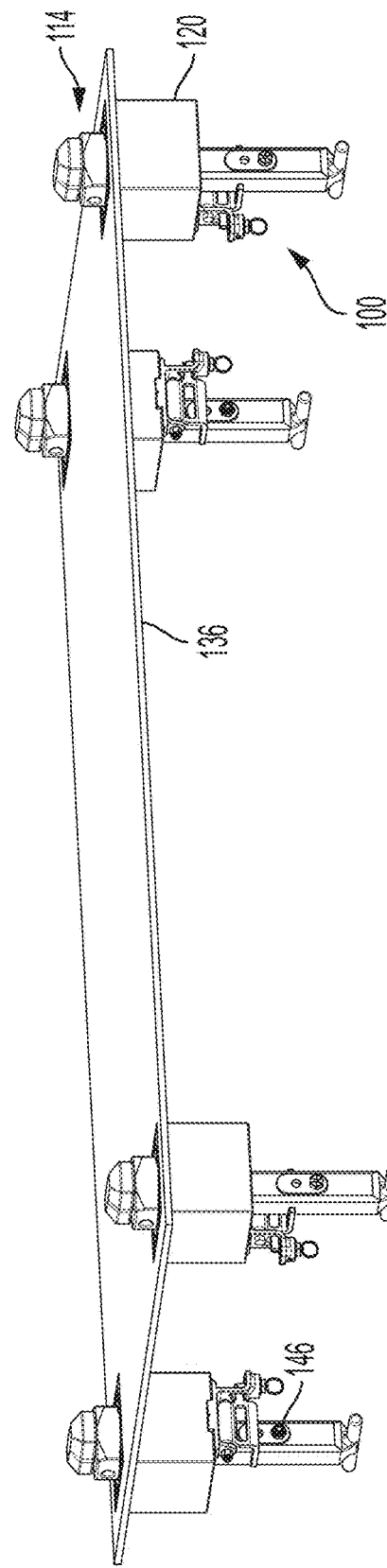
FIG. 17 is a perspective view of the flatbed of FIG. 15, in which the latches of the twistlock assemblies are mounted to pivot in a transverse direction.

FIGS. 15-17 illustrate a flatbed 136 having four twistlock assemblies 114 mounted thereon. The shorter sides of flatbed 136 are at the front and rear of the flatbed. The longitudinal direction is along the length of flatbed 136 and the transverse direction is along the shorter sides of flatbed 136. Latch locking assemblies 100 can be installed on twistlock assemblies such that the latch pivots in a longitudinal or transverse direction of flatbed 136. The latch pivoting direction is dependent on available clearance and access around the twistlock housing bases 120 at the bottom of the twistlock assemblies 114. In FIG. 16 latch locking assemblies 100 are mounted on twistlock assemblies 114 so that the latch pivots in a longitudinal direction, and in FIG. 17 latch locking assemblies 100 are mounted on twistlock assemblies 114 so that the latch pivots in a transverse direction. In FIG. 16, two latch assemblies 100 are installed on the outside sides of twistlock housing bases 120 and two latch assemblies 100 are installed on the inside sides of twistlock housing bases 120, but alternatively all four of latch assemblies 100 could be installed on the outside sides of twistlock housing bases 120 or the inside sides of the twistlock housing bases. In FIG. 17, latch assemblies 100 are installed on the inside sides of twistlock housing bases 120, but latch assemblies 100 could alternatively be installed on the outside sides of twistlock housing bases 120. For reasons explained in detail below, handle bolt 146 must be installed in an upper bolt hole when latch locking assemblies 100 are mounted so that the latch pivots in a longitudinal direction as in FIG. 16, and must be installed in a lower bolt hole when the latch locking assemblies are mounted so that the latch pivots in a transverse direction as in FIG. 17.

Latch assembly 100 is welded to the outer housing of twistlock assembly 114 on one of its four sides before delivery of the twistlock assembly to a customer. The installer of the twistlock assemblies has to decide, based on the available space around the twistlock assembly on the vehicle, on which side of the twistlock assembly the latch assembly can be operated, which determines whether the latch is going to be operated in the transverse direction or the longitudinal direction. Once that determination has been made, the housing is welded into the vehicle with the latch assembly either facing toward or away from the longitudinal ends of the flatbed or facing toward or away from the longitudinal center. If the installer has determined that there is more space on the sides of the housing (either the outside side or the inside side) the housing will be welded in place, so the latch operates in the transverse direction.

With reference to FIGS. 18A-18C, T-shaped locking pin 116 of a twistlock assembly for use with a latch according to the invention has a lower handle bolt hole 138 and an upper handle bolt hole 140 drilled perpendicular to lower handle bolt hole 138. With reference to FIGS. 19A and 19B, illustrating handle 118 and square handle extension 119 for use with the T-shaped locking pin 116 of FIGS. 18A-18C, it can be seen that square handle extension 119 has a lower handle bolt hole 142 and an upper handle bolt hole 144.

Figure 20:
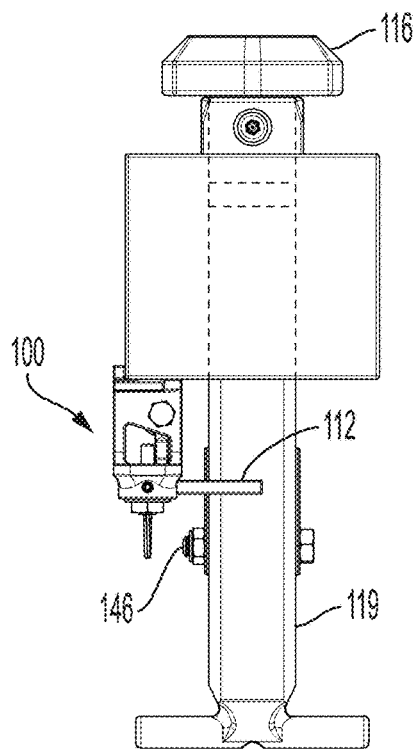
FIG. 20 is a side view of the latch and twistlock assemblies of FIG. 5, with the internal stem of the T-shaped locking pin shown in dashed lines, the latch being mounted to pivot in a transverse direction of a flatbed.
Figure 21:
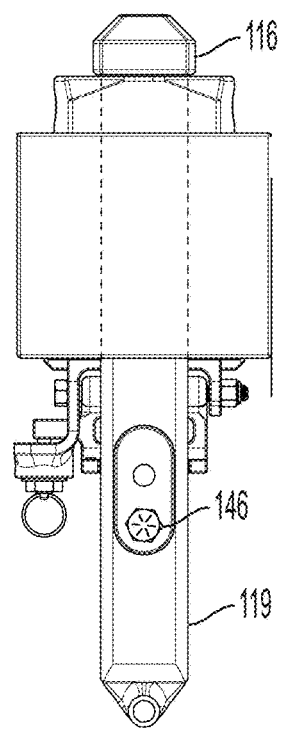
FIG. 21 is a rear view of the latch and twistlock assemblies of FIG. 20.
Figure 22:
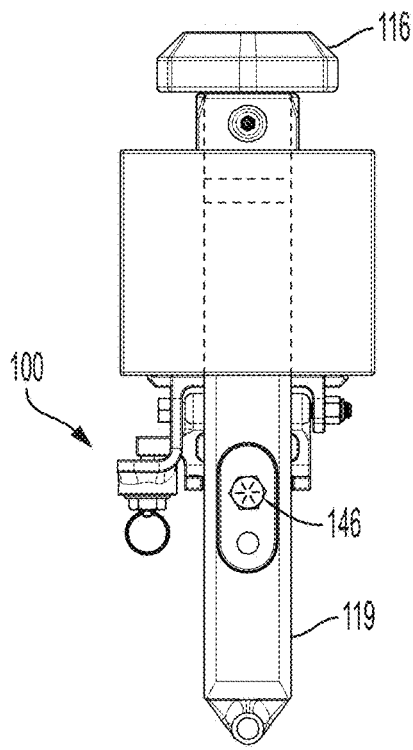
FIG. 22 is a rear view of the latch and twistlock assemblies of FIG. 5, with the internal stem of the T-shaped locking pin shown in dashed lines, the latch being mounted to pivot in a longitudinal direction of a flatbed.
Figure 23:
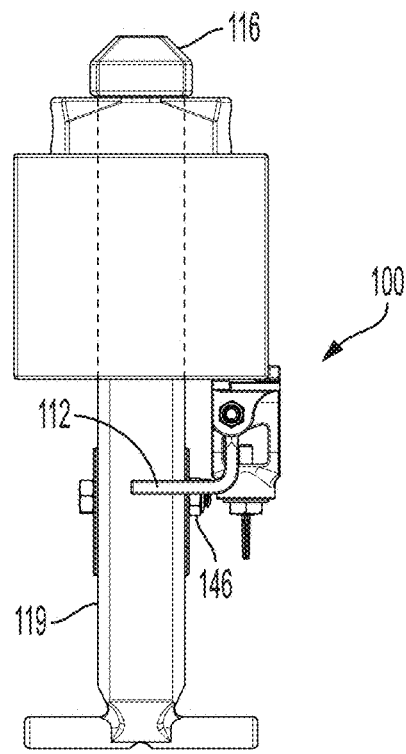
FIG. 23 is a side view of the latch and twistlock assemblies of FIG. 22.

As can be seen in FIGS. 20 and 21, if it is desired to mount latch locking assembly 100 so that the latch pivots in a transverse direction of a flatbed, then handle hex bolt 146 should be inserted through the lower handle bolt holes of locking pin 116 and square handle extension 119 respectively, so that handle bolt 146 cannot interfere with either of the two legs of forked portion 112 of the latch. As can be seen in FIGS. 22 and 23, if it is desired to mount latch locking assembly 100 so that the latch pivots in a longitudinal direction of a flatbed, then handle bolt 146 should be inserted through the upper handle bolt holes of locking pin 116 and square handle extension 119 respectively, so that handle bolt 146 cannot interfere with either of the two legs of forked portion 112 of the latch.

Since square handle extension 119 is attached to T-shaped locking pin 116 with a handle hex bolt 146, there are two holes 138 and 140 in the bottom of the T-shaped locking pin. Handle hex bolt 146 must be in the longitudinal direction when the latch pivots in the longitudinal direction so that the forked latch clears the handle bolt on the handle extension tube, and the handle bolt must be in the transverse direction when the latch pivots in the transverse direction. Since T-shaped locking pin 116 always must be in the same position when being loaded onto and must always be in the same position when being locked, the locking pin must have two bolt holes 138 and 140 that are perpendicular to each other to accommodate the two different directions in which the latch might need to pivot. Locking pin 116 does not change position; rather, only square handle extension 119 changes position a quarter of a turn depending on how the latch needs to pivot.

Figure 24:
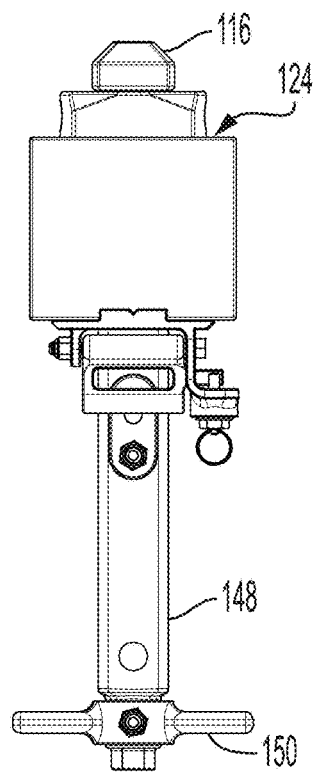
FIG. 24 is a front view of the latch assembly of FIGS. 1A and 1B welded to a height-adjustable twistlock assembly having a long extension tube for the T-shaped locking pin instead of having a neck of the handle, with the latch assembly in the locked position.
Figure 25:
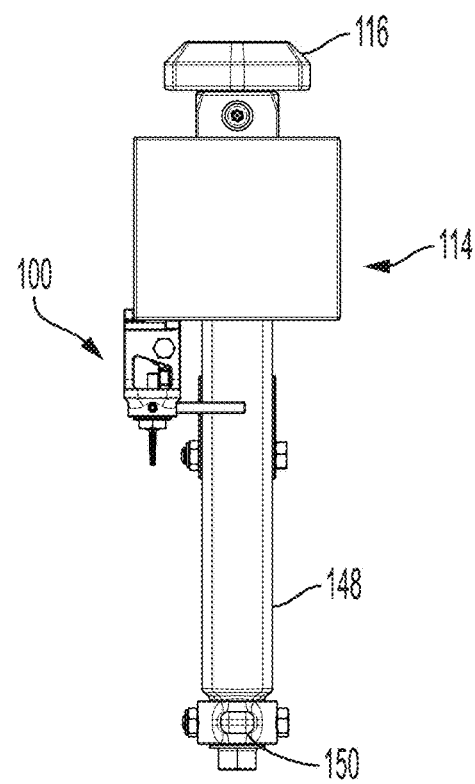
FIG. 25 is a side view of the latch and twistlock assemblies of FIG. 24.
Figure 26:
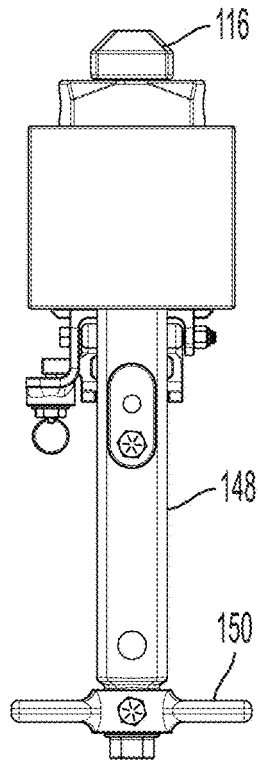
FIG. 26 is a rear view of the latch and twistlock assemblies of FIG. 24.
Figure 27:
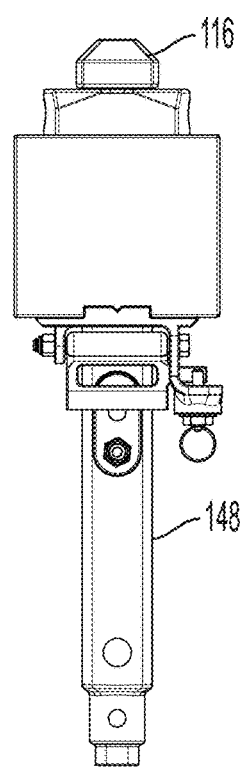
FIG. 27 is a front view of the latch assembly of FIGS. 1A and 1B welded to a height-adjustable twistlock assembly similar to the twistlock assembly shown in FIG. 24 but having no handle.
Figure 28:
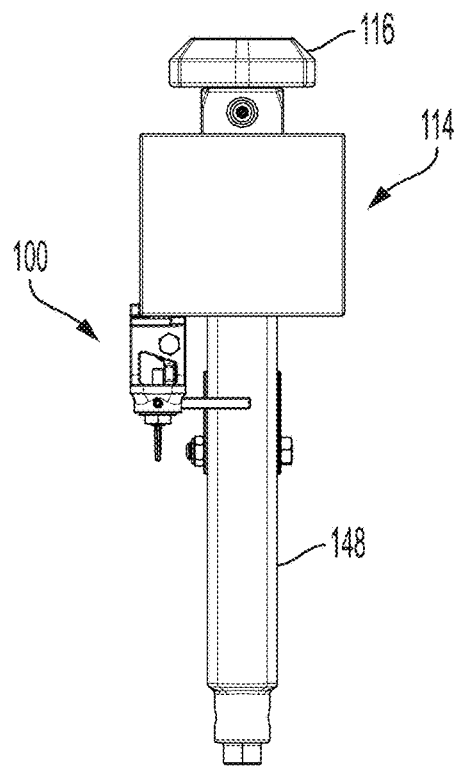
FIG. 28 is a side view of the latch and twistlock assemblies of FIG. 27.
Figure 29:
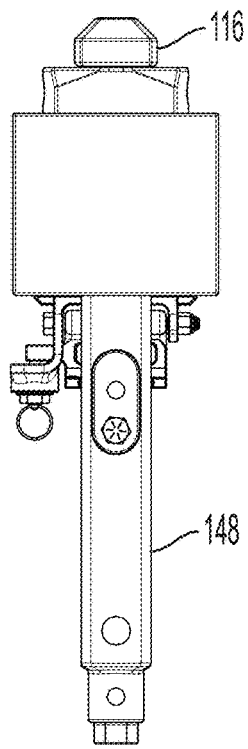
FIG. 29 is a rear view of the latch and twistlock assemblies of FIG. 28.

Latch locking assembly 100 may be mounted on other types of height-adjustable twistlock configurations, with or without handles. For example, as is illustrated in FIGS. 24-26, latch locking assembly 100 may be welded to a height-adjustable twistlock assembly 114 having a long extension tube 148 for T-shaped locking pin 116 instead of having a square handle extension, extension tube 148 having a square horizontal cross section, a handle 150 being secured to an end of extension tube 148. In one embodiment, the distance between load level 124 and the center of handle 150 is seventeen inches. Alternatively, as is illustrated in FIGS. 27-29, latch locking assembly 100 may be welded to a height-adjustable twistlock assembly 114 similar to the twistlock assembly shown in FIGS. 24-26 but having no handle. Since long extension tube 148 is attached to T-shaped locking pin 116 with a hex bolt, there are two holes near the bottom of the T-shaped locking pin that are perpendicular to each other to accommodate the two different directions in which the latch might need to pivot, similar to the holes in the T-shaped locking pin illustrated in FIGS. 18A-18C. Long extension tube 148, also, has a lower extension tube bolt hole and an upper extension tube bolt hole. The locking pin does not change position; rather, only long extension tube 148 changes position a quarter of a turn depending on how the latch needs to pivot.

Thus, the gravity latch locking assembly according to the invention can be fitted at the bottom of a height-adjustable vehicle twistlock housing, either engaging a T-handle with a square tube extension or a square tube extension without a T-handle, the handle stem or the locking pin extension being bolted firmly to the T-shaped locking pin to prevent the locking pin from twisting from locked to open position. The latch locking assembly is designed so that it can operate within a 3-inch vertical movement of the handle or the locking pin extension as the height-adjustable twistlock is adjusted up or down.

All parts of latch locking assembly 100 may be made of steel. Alternatively, mounting bracket 102 and latch 104 could be made from a different material such as a polymer (in which case mounting bracket would have to be attached to twistlock assembly 114 by a means other than welding).

There has been described a latch locking assembly for locking the locking pins of height-adjustable vehicle twistlock assemblies in both extended and non-extended positions, and a twistlock assembly that enables the locking latch assembly to be mounted on any side of the twistlock assembly. While a particular form of the invention has been illustrated and described, it will be apparent that various modifications and combinations of the invention detailed in the text and drawings can be made without departing form the spirit and scope of the invention. Accordingly, it is not intended that the invention be limited, except as by the appended claims.

What is claimed is:

1. A locking latch assembly for a twistlock assembly that is adjustable over a range of heights of a load level of the twistlock assembly relative to a deck level of the twistlock assembly, the twistlock assembly comprising a housing base and a locking pin rigidly connected with a shaft, the locking pin having an adjustable vertical position relative to the housing base of the twistlock assembly that corresponds to a vertical position of the load level of the twistlock assembly relative to the deck level of the twistlock assembly, the locking latch assembly comprising:
 a mounting bracket configured to be secured to the housing base of the twistlock assembly;
 a latch having a forked portion configured to engage with the shaft;
 an axle passing through the mounting bracket, the latch being secured around the axle to allow the latch to pivot relative to the mounting bracket; and
 a latch pin secured on the mounting bracket, the latch pin engaging a first surface of the latch when the latch is in a locked position in which the latch is at a first angular position relative to the mounting bracket and the forked portion of the latch engages with the shaft, and engaging a second surface of the latch when the latch is in an unlocked position in which the latch is at a second angular position relative to the mounting bracket and the forked portion of the latch is disengaged from the shaft, wherein the latch pin is configured to be disengaged from the latch to allow the latch to pivot relative to the mounting bracket between the locked position and the unlocked position;
 the forked portion of the latch being configured to engage with the shaft, in the locked position of the latch, so that the shaft is substantially restricted from rotational movement while the latch is in the locked position, throughout all of the range of heights of the twistlock assembly.

2. A locking latch assembly in accordance with claim 1, wherein the latch comprises a tab, and the latch pin engages a first surface of the tab when the latch is in the locked position, and engages a second surface of the tab when the latch is in the unlocked position.

3. A locking latch assembly in accordance with claim 2, wherein the tab extends from a flat portion of the latch that is angled with respect to the forked portion of the latch.

4. A locking latch assembly in accordance with claim 3, wherein latch pin is a pull pin of a pull pin assembly.

5. A locking latch assembly in accordance with claim 4, wherein the pull pin assembly is mounted within a tab of the mounting bracket.

6. A locking latch assembly in accordance with claim 4, wherein the pull pin is spring loaded within the pull pin assembly.

7. A locking latch assembly in accordance with claim 6, wherein the pull pin assembly comprises a ring with which the spring-loaded pull pin can be retracted away from engagement with the latch.

8. A locking latch assembly in accordance with claim 1, wherein the mounting bracket is configured to be secured to a bottom surface of the housing base of the twistlock assembly.

9. A locking latch assembly in accordance with claim 8, wherein the mounting bracket comprises a tab configured to be secured to a side surface of the housing base of the twistlock assembly.

10. A locking latch assembly in accordance with claim 1, wherein the mounting bracket has at least one tab that fits within at least one corresponding recess in the housing base of the twistlock assembly.

11. A locking latch assembly in accordance with claim 1, wherein the mounting bracket is configured to be secured to the housing base of the twistlock assembly in any of multiple orientations relative to the twistlock assembly such that the latch pivots in any of multiple directions relative to the twistlock assembly.

12. A locking latch assembly in accordance with claim 11, wherein the mounting bracket has at least one tab that fits within at least one of a plurality of recesses in the housing base of the twistlock assembly in any of the multiple orientations of the mounting bracket relative to the twistlock assembly.

13. A twistlock assembly that is adjustable over a range of heights of a load level of the twistlock assembly relative to a deck level of the twistlock assembly, comprising:
a housing base;
a locking pin rigidly connected with a shaft, the locking pin having an adjustable vertical position relative to the housing base of the twistlock assembly that corresponds to a vertical position of the load level of the twistlock assembly relative to the deck level of the twistlock assembly; and
a locking latch assembly comprising:
a mounting bracket configured to be secured to the housing base of the twistlock assembly;
a latch having a forked portion configured to engage with the shaft;
an axle passing through the mounting bracket, the latch being secured around the axle to allow the latch to pivot relative to the mounting bracket; and
a latch pin secured on the mounting bracket, the latch pin engaging a first surface of the latch when the latch is in a locked position in which the latch is at a first angular position relative to the mounting bracket and the forked portion of the latch engages with the shaft, and engaging a second surface of the latch when the latch is in an unlocked position in which the latch is at a second angular position relative to the mounting bracket and the forked portion of the latch is disengaged from the shaft, wherein the latch pin is configured to be disengaged from the latch to allow the latch to pivot relative to the mounting bracket between the locked position and the unlocked position;
the forked portion of the latch being configured to engage with the shaft, in the locked position of the latch, so that the shaft is substantially restricted from rotational movement while the latch is in the locked position, throughout all of the range of heights of the twistlock assembly.

14. A twistlock assembly that is adjustable over a range of heights of a load level of the twistlock assembly relative to a deck level of the twistlock assembly, comprising:
a T-shaped twistlock locking pin having a head and a stem;
a housing base, the stem of the T-shaped twistlock locking pin passing through the housing base, the T-shaped twistlock locking pin having an adjustable vertical position relative to the housing base of the twistlock assembly that corresponds to a vertical position of the load level of the twistlock assembly relative to the deck level of the twistlock assembly; and
a shaft secured to the stem of the T-shaped locking pin;
the stem of the T-shaped twistlock locking pin having an upper bolt hole and a lower bolt hole passing therethrough, the upper bolt hole passing through the stem in a direction perpendicular to the lower bolt hole;
the shaft having an upper bolt hole and a lower bolt hole passing therethrough, the upper bolt hole passing through the stem in a same direction as the lower bolt hole;
the shaft being adjustably secured to the stem of the T-shaped twistlock locking pin by a bolt passing through the upper bolt holes of the shaft and the stem or passing through the lower bolt holes of the shaft and the stem.

15. A twistlock assembly in accordance with claim 14, wherein the shaft is a neck of a T-handle with which the locking pin can be rotated, the neck of the T-handle being secured to the stem of the T-shaped twistlock locking pin.

16. A twistlock assembly in accordance with claim 14, wherein the shaft is an extension tube secured to the stem of the T-shaped twistlock locking pin.

17. A twistlock assembly in accordance with claim 16, wherein a handle is secured to a lower end of the extension tube.

18. A twistlock assembly in accordance with claim 16, wherein the extension tube is handleless.

19. A twistlock assembly in accordance with claim 14, wherein the housing base is configured such that a locking latch assembly can be secured to the housing base of the twistlock assembly in any of multiple orientations relative to the twistlock assembly such that a latch of the locking latch assembly can pivot in any of multiple directions relative to the twistlock assembly.

20. A twistlock assembly in accordance with claim 19, wherein the housing base has a plurality of recesses within which at least one tab of the locking latch assembly can fit in any of the multiple orientations of the mounting bracket relative to the twistlock assembly.

* * * * *